US007849404B2

(12) United States Patent
Tateishi et al.

(10) Patent No.: US 7,849,404 B2
(45) Date of Patent: Dec. 7, 2010

(54) SYSTEM FOR DETERMINING WHETHER SCREEN DISPLAYED BY PROGRAM SATISFIES SPECIFICATION

(75) Inventors: Takaaki Tateishi, Yamato (JP); Hisashi Miyashita, Machida (JP); Akihiko Tozawa, Tokyo (JP); Shin Saito, Yamato (JP); Naoshi Tabuchi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/695,692

(22) Filed: Apr. 3, 2007

(65) Prior Publication Data

US 2007/0233737 A1 Oct. 4, 2007

(30) Foreign Application Priority Data

Apr. 3, 2006 (JP) ............................. 2006-101584

(51) Int. Cl.
*G06F 17/00* (2006.01)
(52) U.S. Cl. ...................................................... 715/237
(58) Field of Classification Search .................. 715/237
See application file for complete search history.

(56) References Cited

U.S. PATENT DOCUMENTS

| 6,772,395 | B1 * | 8/2004 | Hyman et al. ................ 715/234 |
| 7,237,225 | B2 * | 6/2007 | Kompalli et al. ............. 717/108 |
| 7,269,664 | B2 * | 9/2007 | Hutsch et al. ................ 709/246 |
| 7,424,671 | B2 * | 9/2008 | Elza et al. .................... 715/234 |
| 7,496,837 | B1 * | 2/2009 | Larcheveque et al. ........ 715/237 |
| 7,530,107 | B1 * | 5/2009 | Ono et al. ....................... 726/25 |
| 7,672,957 | B2 * | 3/2010 | Cotichini et al. ............. 715/236 |
| 2002/0156814 | A1 * | 10/2002 | Ho .............................. 707/514 |
| 2005/0132284 | A1 * | 6/2005 | Lloyd et al. .................. 715/517 |

OTHER PUBLICATIONS

Kirkegaard, et al., "Static analysis of XML transformations in Java" IEEE Transactions on Software Engineering. vol. 30, No. 3, pp. 181-192, published Mar. 2004.*

(Continued)

*Primary Examiner*—Amelia Rutledge
(74) *Attorney, Agent, or Firm*—Gibb I.P. Law Firm, LLC

(57) ABSTRACT

It is determined whether a plurality of screens to be sequentially displayed by a process of a program satisfies a specification without executing this program. A system of the present invention stores a first schema prescribing a specification of a first screen, a second schema prescribing a specification of a second screen, and an event switching the display by program from the first screen to the second screen. First, a partial program executed in response to an event generated during displaying the screen satisfying the first schema is extracted from a program on the basis of the first schema and the event. Next, an intermediate program for calculating a set of screens being displayed in response to an event generated during displaying screens in a set of screens satisfying the first schema from this set is generated on the basis of the partial program. Next, it is determined that these screens satisfy a specification on condition that the first screen satisfies the first schema and a set of screens obtained by applying the intermediate program to the first schema satisfies the second schema.

1 Claim, 15 Drawing Sheets

OTHER PUBLICATIONS

Crick, "A BCPL Front End for GCC", Thesis, University of Bath, May 2004, p. 1-94.*

Kazunori Washio, Makoto Matsushita, Katsuo Inoue:"Syntan verification technique using data flow analysis for HTML documents including JavaScript", The Institute of Electronics, Information and Communication Engineers, SS2002-22, vol. 102, No. 370, pp. 13-18, 2002.

Yasuhiko Minamide: "Static approximation of dynamically generated Web pages", World Wide Web (WWW), 2005, pp. 432-441.

Cristiano Calcagno, Philippa Gardner, Uri Zarfaty: "Context Logic and Tree Update", Principles of Programming Languages (POPL), 2005, pp. 271-282.

Eugenio Di Sciascio, Francesco M. Donini, Marina Mongiello, Giacomo Piscitelli: "Web applications design and maintenance using Symbolic Model Checking", European Conference On Software Maintenance And Reengineering (CSMR), 2003, pp. 1-10.

(Eun-Hye), Hiroshi Watanabe: "Modeling and verification for class design specifications of Web applicaton", Software text symposium, 2005, pp. 1-8.

H. Comon, et al.: "Tree Automata Techniques and Applications", http://www.grappa.univ-lille3.fr/tata/, 1997, pp. 1-222.

Kazunori Washio, Makoto Matsushita, Katsuo Inoue:"Syntan verification technique using data flow analysis for HTML documents including JavaScript", The Institute of Electronics, Information and Communication Engineers, SS2002-22, vol. 102, No. 370, 2002, pp. 1-8.

Dreamweaver 8 (Macromedia) http://www.adobe.com/products/dreamweaver/, Mar. 2, 2007, pp. 1-2.

aDesigner (IBM) http://www.research.ibm.com/trl/projects/acc_tech/adesigner_e.htm, Mar. 2, 2007, pp. 1-2.

Haruo Hosoya and Benjamin Pierce: "Regular expression pattern matching for XML", Principles of programming languages (POPL), 2001, pp. 67-80.

Takaaki Tateishi, Shin Saitoh, Hisashi Miyashita, "Accessibility check tool for DHTML, " Poster Presentation, The 9th Workshop on Systems for Programming and Applications (SPA'06), Tochigi, Japan, Mar. 6, 2006 (Summary Attached), 1 page.

* cited by examiner

20

```
 1: <?xml version="1.0" encoding="UTF-8"?>
 2: <?xml-stylesheet type="text/css"
 3: href="http://www.△△△.org/StyleSheets/TR/base"?>
 4: <!DOCTYPE html PUBLIC"-//W3C//DTD XHTML 1.1 Strict//EN"
 5:     "http://www.△△△.org/TR/xhtml1/DTD/xhtml1-strict.dtd">
 6: <html lang="en" xml:lang="en" xmlns="http://www.△△△.org/1999/xhtml"
 7:    xmlns:x2="http://www.△△△.org/TR/xhtml2"
 8:    xmlns:rote="http://www.△△△.org/2005/01/wai-rdf/GUIRole Taxonomy#"
 9:    xmlns:state="http://www.△△△.org/2005/07/aaa">
10: <head>
11: <title>DHTML Checkbox</title>
12:
13: <script language="javascript"type="text/javascript">
14: <!-
15: input = document.createElement("input");
16: function checkBoxEvent(event)
17: {
18:   if((event.type=="click"&& eventbutton = 0)||
19:      (event.type=="keydown"&& event.keyCode == 32)){
20:     //Toggle checkbok
21:     var checkbox = event.target;
22:     if(checkbox.getAttributeNS("http://www.△△△.org/2005/07/aaa",
23: "checked")=="true"){
24:       checkbox.setAttributeNS("http://www.△△△.org/2005/07/aaa",
25: "checked","false");
26:       checkbox.removeChild(input);
27:     }
28:     else{
29:       checkbox.setAttributeNS("http://www.△△△.org/2005/07/aaa",
30: "checked","true");
31:       checkbox.appendChild(input);
32:     }
33:     return false; // Don't continue propagating event
34:   }
35:   return true; // Browser can still use event
36: };
37: ->
38: </script>
39: <style type="text/css">
40:   @name space state url("http://www.△△△.org/2005/07/aaa");
41:
42:   .checkbox:before{
43:     content: url('./unchecked.gif')
44:   }
45:   .checkbox[state|checked="true"]:before{
46:     content: url('./checked.gif')
47:   }
48: </style>
49: </head>
50:

51: <body>
52: <div>
53:   <span class="checkbox"id="chbox1" x2:role="role:checkbok"
54: state:checked="false"tabindex="0"
55:            onkeydown="return checkBoxEvent(event);"onclick="return
56: checkBoxEvent(event);">check</span>
57: </div>
58: </body>
59: </html>
```

INITIAL SCREEN

FIG. 2

```
PREREQUISITE : STATUS=unchecked, EVENT=click
function checkBoxEvent' (event)
{
    var checkbox = event.target;
    checkbox.setAttributeNS("http://www.△△△.org/2005/07/aaa","checked","true");
    return false; // Don't continue propagating event
};
```
50

⇩

```
$unchecked' = html(body(..., $checkbox2,...))
$checkbox1 = span(@class(checkbox),@id(chbox1),@role(checkbox),
    @checked(false),@tabindex(0),
    @onkeydown("return checkBoxEvent(event);"),
    @onclick("return checkBoxEvent(event);"),...),
$checkbox2 = setAttributeNS($checkbox1,"http://www.△△△.org/2005/07/aaa","checked","true");
```
60

← DESCRIPTION BY TOP-DOWN TREE TRANSDUCER

⇩

```
$unchecked' = html(body(..., $checkbox2,...))
$checkbox2 = span(@class(checkbox),@id(chbox1),@role(checkbox),
    @checked(true),@tabindex(0),
    @onkeydown("return checkBoxEvent(event);"),
    @onclick("return checkBoxEvent(event);"),
    input,...),
```

FIG. 8

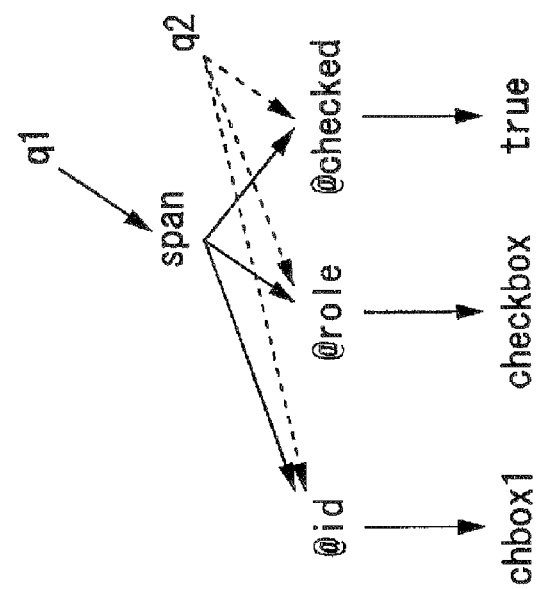
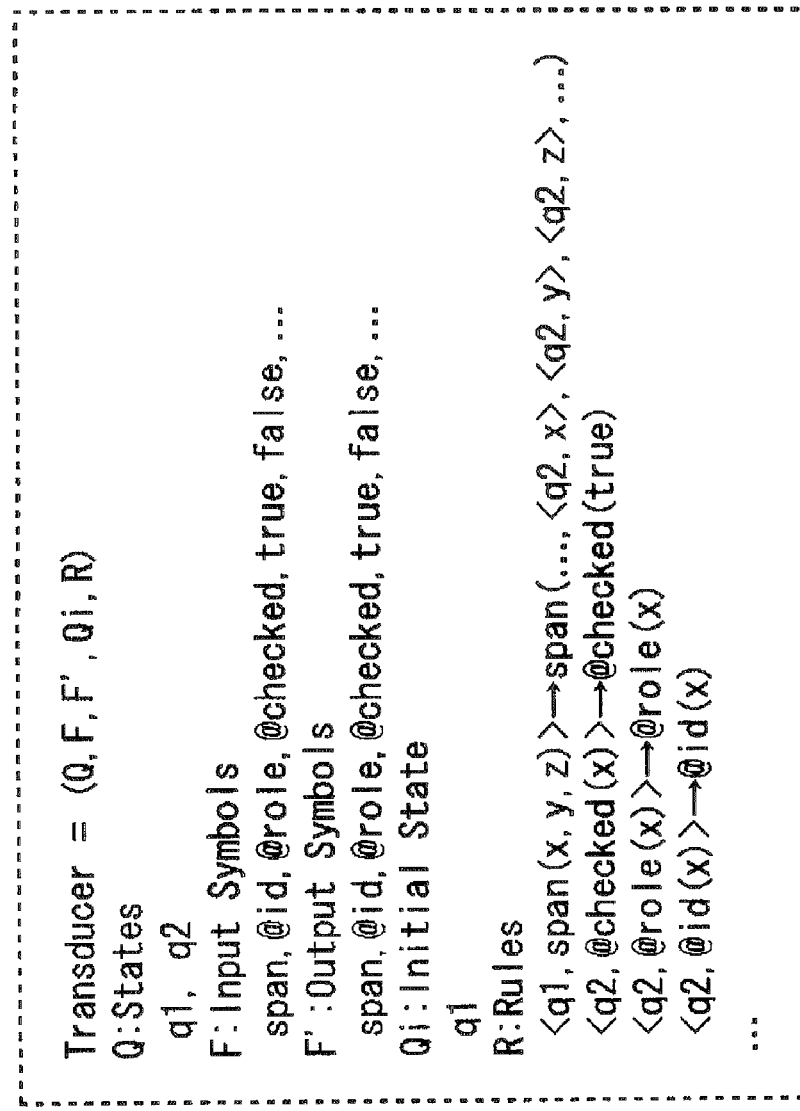
FIG. 9

```
1:  function checkBoxEvent(event)
2:  {
3:    if((event.type == "click"&& event.button == 0)||
4:       (event.type == "keydown"&& event.keyCode == 32)){
5:      // Toggle checkbox
6:      var checkbox = event.target;
7:      if(checkbox.getAttributeNS("http://www.△△△.org/2005/07/aaa","checked")=="true"){
8:        checkbox.setAttributeNS("http://www.△△△.org/2005/07/aaa","checked","false");
9:        checkbox.removeChild(input);
10:     }
11:     else{
12:       checkbox.setAttributeNS("http://www.△△△.org/2005/07/aaa","checked","true");
13:       checkbox.appendChild(input);
14:     }
15:     return false; // Don't continue propagating event
16:   }
17:   return true; // Browser can still use event
18: };
```

⇩

```
1: (PREREQUISITE : STATUS=unchecked, EVENT=click)
2: function checkBoxEvent' (event)
3: {
4:   var checkbox = event.target;
5:   checkbox.setAttributeNS("http://www.△△△.org/2005/07/aaa","checked","true");
6:   checkbox.appendChild(input);
7:   return false; // Don't continue propagating event
8: };
```
50

*FIG. 11*

```
PREREQUISITE : STATUS=unchecked,  EVENT=click
function checkBoxEvent (event)
{
    var checkbox = event.target;
    checkbox.setAttributeNS("http://www.△△△.org/2005/07/aaa","checked","true");
    checkbox.appendChild(input);
    return false; // Don't continue propagating event
};
```
```
$unchecked' = html(body(..., $checkbox3,...))
$checkbox1 = span(@class(checkbox),@id(chbox1),@role(checkbox),
            @checked(true),@tabindex(0)
            @onkeydown("return checkBoxEvent(event);"),
            @onclick("return checkBoxEvent(event);"),...)
$checkbox2 = appendChild($checkbox1,input)
$checkbox3 = setAttributeNS($checkbox2,"http://www.△△△.org/2005/07/aaa","checked","true");
```
```
$unchecked' = html(body(..., $checkbox3,...))
$checkbox3 = span(@class(checkbox),@id(chbox1),@role(checkbox),
            @checked(true),@tabindex(0)
            @onkeydown("return checkBoxEvent(event);"),
            @onclick("return checkBoxEvent(event);"),
            input,...)
```

*FIG. 12*

SYSTEM FOR DETERMINING WHETHER SCREEN DISPLAYED BY PROGRAM SATISFIES SPECIFICATION

FIELD OF THE INVENTION

The present invention relates to a system that determines whether a screen displayed by a program satisfies a specification. More particularly, the present invention relates to a system that statically determines whether a plurality of screens to be sequentially displayed satisfies a prepared specification.

BACKGROUND OF THE INVENTION

In recent years, a design of a document such as a Web page available on the Internet becomes various. Although a well-designed Web page looks good, a particular user such as a visually handicapped person may not understand the Web page very well. Moreover, when a structure of a page violates a syntax rule, some kinds of Web browsers may not display the page correctly. Therefore, there have been conventionally proposed some systems that determine whether a document such as a Web page satisfies a prepared specification to evaluate the easiness of understanding or designate a point to be corrected in the page. See, for example, Non-Patent Documents (8) and (9). Moreover, researches for prescribing a specification of a structured document such as HTML or XML and researches for a schema or the like for prescribing a specification have been advanced. See, for example, Non-Patent Documents (2), (4), and (5).

Non-Patent Documents (1) Yasuhiko Minamide, "Static approximation of dynamically generated Web pages", World Wide Web (WWW), 2005

(2) FDR2 (Formal Systems)

(3) Cristiano Calcagno, Philippa Gardner, Uri Zarfaty, "Context Logic and Tree Update", Principles of Programming Languages (POPL), 2005

(4) Eugenio Di Sciascio, Francesco M. Donini, Marina Mongiello, Giacomo Piscitelli, "Web applications design and maintenance using Symbolic Model Checking", European Conference On Software Maintenance And Reengineering (CSMR), 2003

(5) Eun-Hye CHOI, Hiroshi Watanabe, "Modeling and Verification of Class Specification for Web Applications", Japan Symposium on Software Testing (6) H. Comon, et al., "Tree Automata Techniques and Applications", http://www.grappa.univ-lille3.fr/tata/, 1997

(7) Haruo Hosoya and Benjamin Pierce, "Regular expression pattern matching for XML", Principles of programming languages (POPL), 2001

(8) aDesigner (IBM)

(9) Dreamweaver 8 (Macromedia)

(10) Kazunori Washio et al., "Syntax Verification Technique Using Data Flow Analysis for Java Script Embedded HTML Documents", Technical Report of IEICE, SS2002-22, Vol. 102, No. 370, pp. 13-18,

(11) Takaaki Tateishi, et al., "Accessibility Checking Tool for DHTML", http://spa.jssst.or.jp/2006/, SPA2006

Some Web pages may include not only static images but also moving images. For example, Flash of Macromedia company or Dynamic HTML are used as a standard to generate moving images. The moving images are realized by sequentially switching the display of static images by means of a program supplied with a Web page. If we try to apply the technologies concerning static images to moving images, it is necessary to actually execute the program and determine whether the specification is satisfied by each static image generated as a result of the execution. However, in case that it is determined whether all static images to be displayed satisfy the specification, the execution states of the program explosively increase. Therefore, the determination may not be completed in realistic time.

In addition, there has been proposed a technique for analyzing a status after executing a program without executing the program. See, for example, Non-Patent Documents (1), (3), (10), and (11). According to techniques of Non-Patent Documents (1) and (10), a character string to be generated by executing a program can be analyzed without really executing the program. However, according to these techniques, it is not possible to analyze how to change data with a tree structure described in HTML, XML or the like as a result of executing a program. Moreover, Non-Patent Document (3) discloses logic for determining whether data with a tree structure obtained by executing a program satisfy a specification. However, this document does not disclose how an information-processing apparatus determines satisfaction of specifications on the basis of this logic automatically. Moreover, Non-Patent Document (11) discloses that a technique for analyzing a character string generated as a result of executing a program should be applied to DOM (document object model) with a tree structure. However, Non-Patent Document (11) does not disclose a concrete method for applying the technique.

SUMMARY OF THE INVENTION

Therefore, it is an object of the present invention to provide a system, a method, and a program, which are capable of overcoming the above drawbacks accompanying the conventional art. The above and other objects can be achieved by combinations described in the independent claims. The dependent claims define further advantageous and exemplary combinations of the present invention.

To solve the above problem, according to the first aspect of the present invention, there is provided a system that determines whether a plurality of screens to be sequentially displayed by an application program satisfies a prepared specification. The system includes: a specification storing component that stores first schema information prescribing a specification to be satisfied by a first screen, second schema information prescribing a specification to be satisfied by a second screen, and an event making the display by the application program be changed from the first screen into the second screen; an extracting component that extracts a partial program from the application program, which is executed in response to the occurrence of the event during displaying any screen satisfying the first schema information, on the basis of the first schema information and the event; a generating component that generates, from a set of screens satisfying the first schema information, an intermediate program for calculating a set of screens to be displayed on condition that the event occurs during displaying screens in this satisfied set on the basis of the partial program; and a determining component that determines that the plurality of screens satisfies the prepared specification on condition that the first screen satisfies the first schema information and a set of screens obtained by applying the intermediate program to the first schema information satisfies the second schema information. Moreover, there is provided a program for making an information-processing apparatus function as this system and a method for determining whether a plurality of screens satisfies a specification by means of this system.

The summary of the invention does not necessarily describe all necessary features of the present invention. The present invention may also be a sub-combination of the features described above.

According to the present invention, it is possible to determine whether each of a plurality of screens to be sequentially displayed by processing a program satisfies a specification without executing this program.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 2 is a view exemplary showing data stored on a document database;

FIG. 8 is a view showing the first example of an intermediate program;

FIG. 9 is a view exemplary showing a tree transducer used for a process for transforming a partial program to an intermediate program;

FIG. 11 is a view showing the second example of a partial program;

FIG. 12 is a view showing the second example of an intermediate program;

DETAILED DESCRIPTION OF THE DRAWINGS

The embodiments of the invention will now be described based on the preferred embodiments, which do not intend to limit the scope of the present invention, but just exemplify the invention. All of the features and the combinations thereof described in the embodiment are not necessarily essential to the invention.

Figure 1:
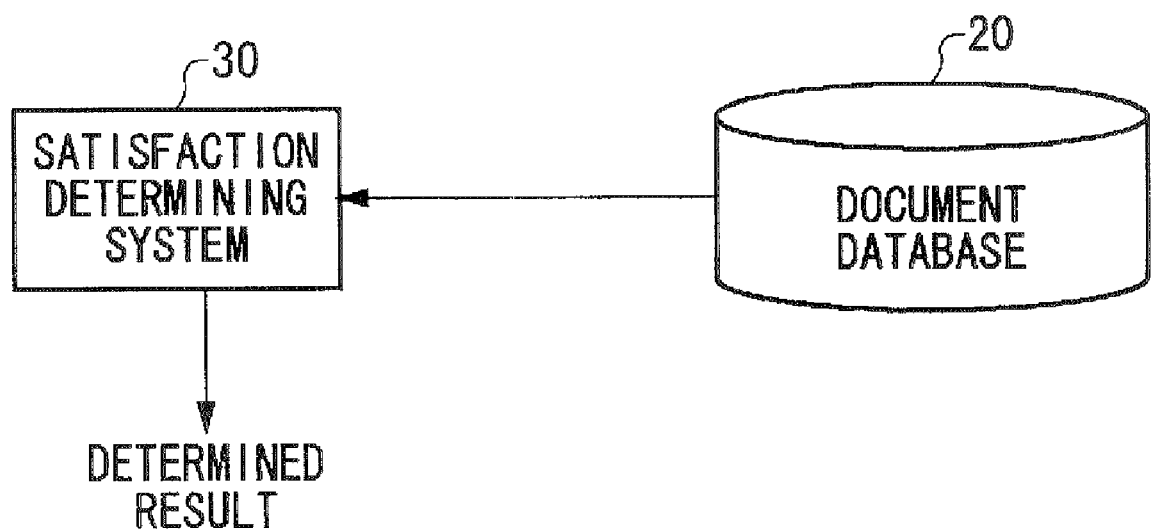
FIG. 1 is a view showing an entire configuration of an information-processing system.

FIG. 1 is a view showing an entire configuration of an information-processing system 10. The information-processing system 10 includes a document database 20 and a satisfaction determining system 30. The document database 20 stores a document by which a plurality of screens is sequentially displayed on a Web browser or the like. For example, this document includes an initial screen described in HTML (Hyper Text Markup Language) or the like and an application program described in a programming language such as JavaScript (a registered trademark). In case that this document is read by the web browser, the initial screen is displayed on the Web browser. The displayed initial screen is sequentially changed in response to the fact that the application program is executed by a Web server or the Web browser. As a result, the plurality of screens is sequentially displayed on the Web browser.

The satisfaction determining system 30 reads the document from the document database 20. Then, the satisfaction determining system 30 determines whether the plurality of screens to be sequentially displayed by the application program satisfies a prepared specification on the basis of the read document. The determined result is output to a user.

In this manner, an object of the information-processing system 10 according to the present embodiment is to analyze the document related to the display of these screens to determine whether each of the screens to be sequentially changed by the application program satisfies a prepared specification without really executing the program.

FIG. 2 is a view exemplary showing data stored on the document database 20. The document database 20 stores a document related to the display of a Web page or the like including moving images. This document includes various types of configuration information from the first line to the ninth line, a header part from the tenth line to the 49th line, and a main part from the 51st line to the 59th line. The header part includes an application program described in JavaScript from the thirteenth line to the 38th line. This application program is a modifying program for modifying the display on the Web page. This application program realizes a check box on the Web page. That is to say, this application program displays a screen on which the check box has been modified to a checked state in case that the displayed check box is clicked by a mouse, and displays a screen on which the check box has been modified to a unchecked state in case that the check box under the checked state is clicked by the mouse.

In detail, this application program defines a function referred to as checkBoxEvent from the 16th line to the 36th line. The function plays a role as an event handler called on condition that an event defined on the 55th line is generated. In case that this function is called, a conditional judgment on the 18th and 19th lines is first executed. That is to say, it is determined whether a left button (ID of zero) of mouse has been clicked or a space key (a key with a key-code of 32) of a keyboard has been pushed down. Otherwise, the process moves to the 35th line to complete the process of function.

In case that the left button is clicked or the space key is pushed down, the processes from the 20th line to the 34th line are executed. First, in the case of the 22nd line, it is determined whether an attribute "checked" showing whether the check box is checked is "true". In case that the check box is checked, the application program takes off a check mark from the check box by changing this attribute into "false" (the 24th line). In this case, the application program may further delete an entry field displayed next to the check box (the 25th line).

On the other hand, the application program attaches the check mark to the check box by changing the attribute "checked" into "true" in case that the check box is not checked (the 29th line). In this case, the application program may generate the entry field next to the check box (the 31st line). In addition, for convenience of explanation, it is assumed that a process for the entry field is not performed in regard to descriptions from FIG. 3 to FIG. 9. It will be below described about when performing the process for the entry field with reference to FIGS. 10 to 14.

This document includes an initial screen on the 51st to 58th lines in addition to the application program. This initial screen includes a character string referred to as check and a check box located next to the string. Since the attribute "checked" is set to "false" on the 54th line, this check box is in a state that a check mark is taken off in an initial state. In case that the check box is clicked by the mouse or is pushed down by the keyboard, the function referred to as checkBox-Event is called (the 55th and 56th lines).

Figure 3:
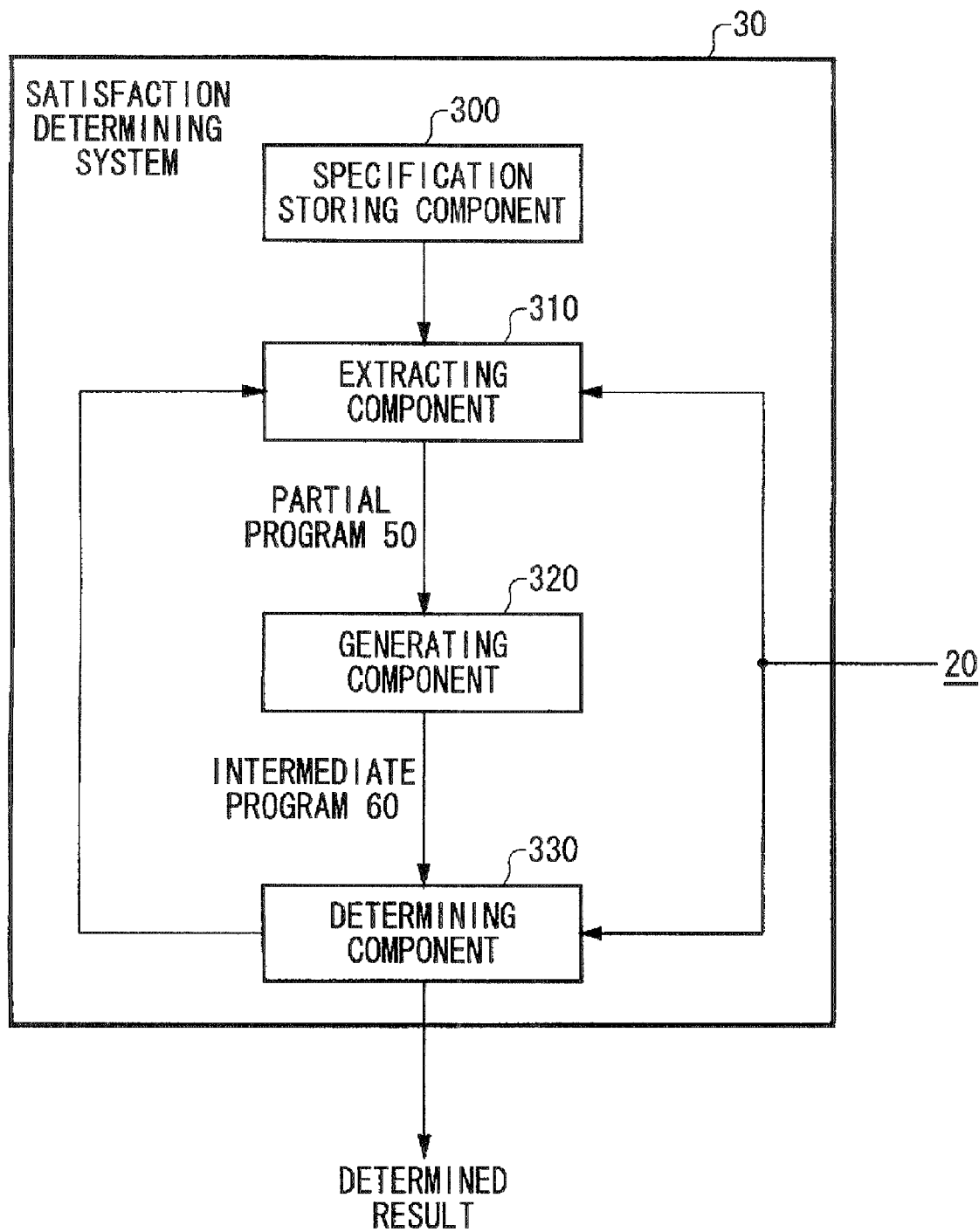
FIG. 3 is a view showing a functional configuration of a satisfaction determining system.

FIG. 3 is a view showing a functional configuration of the satisfaction determining system 30. The satisfaction determining system 30 has a specification storing component 300, an extracting component 310, a generating component 320, and a determining component 330. The specification storing component 300 stores each of a plurality of schema information prescribing a specification that should be satisfied by each of a plurality of screens to be sequentially displayed by the application program. Moreover, the specification storing component 300 stores events by which each of the plurality of screens is switched to each of the other screens. For example, the specification storing component 300 stores first schema information prescribing a specification to be satisfied by a first screen that is an initial screen and second schema information prescribing a specification to be satisfied by a second screen displayed next to the first screen. Then, the specification storing component 300 stores an event by which the display by the application program is switched from the first screen to the second screen. In the case of the application program shown in FIG. 2, the first screen is a screen on which the check box has been checked and the second screen is a screen on which the check box has not been checked. Then, the event, by which the display by the application program is switched from the first screen to the second screen, is performed by clicking a left part on the mouse or pushing down a space key on the keyboard.

Figure 6:
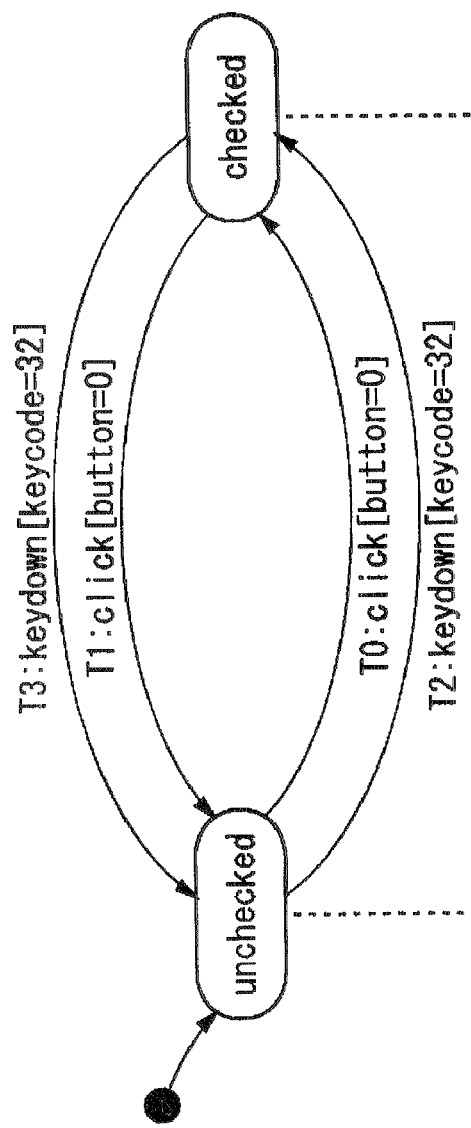
FIG. 6 is a view showing the first example of a specification stored on a specification storing component.

FIG. 6 is a view showing the first example of a specification stored on the specification storing component 300. The lower-left side on the present drawing shows the first schema information prescribing the specification of the first screen on which the check box is not checked. Moreover, the lower-right side on the present drawing shows the second schema information prescribing the specification of the second screen on which the check box is checked. An event by which the display is switched from the first screen to the second screen is a left-click (T0) of the mouse or a push-down (T2) of the space key. An event by which the display is switched from the second screen to the first screen is a left-click (T1) of the mouse or a push-down (T3) of the space key.

The schema information illustrated in FIG. 6 is expressed by a tree and regular dendrogrammar in a language theory. An HTML document is data with a tree structure including other beginning tag and ending tag between a beginning tag and an ending tag. The schema information defines a set of data with such a tree structure by means of regular dendrogrammar. That is to say, first, an HTML document including a tag referred to as <elem> <child1/> <child2/> . . . <childN/> </elem> is expressed by elem(child1, child2, . . . , childN) in the case of schema information. Then, the schema information includes a plurality of grammar rules by which each tag is considered as a terminal symbol and a symbol Gn is considered as a non-terminal symbol.

Specifically, the first schema information (lower-left in the present drawing) includes a body tag. Non-terminal symbols defined in the body tag are G5, G10 and so on. The non-terminal symbols include a span tag and further include other non-terminal symbols G6 to G8. These G6 to G8 respectively define a role attribute of which an attribute value is checkbox, a checked attribute of which an attribute value is false, and an onclick attribute. Moreover, G10 includes another span tag. That is to say, the first schema information defines that the body tag includes a plurality of span tags therein and further the first span tag includes the role attribute, the checked attribute, and the onclick attribute.

Similarly, the second schema information (lower-right in the present drawing) includes a body tag. According to a rule for non-terminal symbols defined in the body tag, a span tag in the body tag includes a role attribute of which an attribute value is checkbox, a checked attribute of which an attribute value is false, and an onclick attribute. That is to say, the second schema information defines that the body tag includes a plurality of span tags therein and further the first span tag includes the role attribute, the checked attribute, and the onclick attribute. In this manner, a specification of contents including moving images is expressed by a specification for each screen and a state transition diagram including an event showing a transition between the screens.

Referring to FIG. 3, the extracting component 310 reads the document from the document database 20. Then, the extracting component 310 extracts, from the application program included in this document, a partial program being executed in response to the occurrence of event during displaying any screen satisfying the first schema information on the basis of the first schema information and the event. The partial program extracted in this manner is considered as a partial program 50. An example of the partial program is shown in FIG. 7.

Figure 7:
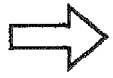
FIG. 7 is a view showing the first example of a partial program.

FIG. 7 is a view showing the first example of the partial program 50. For purposes of illustration, a function check-BoxEvent is extracted from the application program stored on the document database 20 and is shown on the upper side of the present drawing. The extracting component 310 determines, for each conditional branch instruction included in the application program, which branch destination is executed on the basis of these states and events prescribed in the first schema information. As described in FIGS. 6, an event by which the display is switched from the first screen to the second screen is a left-click of the mouse or a push-down of the space key. For this reason, a condition of a conditional branch instruction on the fourth and fifth lines is satisfied. That is to say, the extracting component 310 determines that an instruction sequence from the sixth line to the 15th line is executed.

Moreover, the first schema information includes a checked attribute of which an attribute value is false. For this reason, a condition of a conditional branch instruction on eighth and ninth lines is not satisfied. That is to say, the extracting component 310 determines that an else paragraph beginning from the thirteenth line is executed. The extracting component 310 generates the partial program 50 by continuously ranking an instruction sequence on a branch destination to be executed according to this. As a result, the partial program 50 includes an instruction for changing the attribute value of the checked attribute into true.

Referring to FIG. 3, the generating component 320 generates an intermediate program 60 on the basis of the partial program 50. The intermediate program 60 is a program for calculating, from a set of screens satisfying the first schema information, a set of screens displayed when an event is generated during displaying the screens in the set of screens satisfying the first schema information. The intermediate program 60 is shown in FIG. 8.

FIG. 8 is a view showing the first example of the intermediate program 60. For purposes of illustration, the partial program 50 is illustrated on the upper portion of FIG. 8. First, the generating component 320 performs SSA (StaticSingleAssignment) transform on the partial program 50 to uniquely determine the definition of each variable, and generates a plurality of instructions that obtains the same execution result as the execution result by the partial program 50. The generated instruction sequence is shown on the middle portion of FIG. 8.

It will be described about a transform process. In an SSA form, an assignment to each variable is uniquely determined in the partial program 50. For this reason, it is necessary to change a variable of an assignment destination according to two or more assignment operations into two or more intermediate variables, in order to perform the SSA transform on the partial program 50. In the partial program 50 illustrated in FIG. 8, an object event.target is assigned to a variable checkbox. Furthermore, an attribute value of an attribute included in the variable checkbox is modified by a function setAttributeNS. In this manner, the contents of the same variable checkbox are modified by a plurality of operations by multiple times. For this reason, it is necessary for the generating component 320 to transform a process related to the variable checkbox in some way.

A direct tree operation such as an addition of a child element or a modification of an attribute in the partial program 50 is expressed as an abstract content transform function in the intermediate program 60. The abstract content transform function is a function from schema information to schema information such that $F(T) \epsilon Tr(G)$ is satisfied for arbitrary schema information G and arbitrary contents T satisfying the schema information G. Here, Tr shows an abstract content transform function and F shows the transform of tree by a tree transform function.

For example, if using a programming language such as JavaScript, it is possible to select data between a beginning tag and an ending tag from the contents T and describe an instruction sequence changing the selected data. In detail, a function such as getElementByTagName for extracting a document object from an HTML document is provided in JavaScript. If using this, it is possible to fetch a certain element doc from the HTML document and change a value of an attribute attr corresponding to the element doc into value. In an example of the partial program 50, a tag causing the occurrence of event in the initial screen is selected and stored on the variable checkbox. Then, an attribute of the tag stored on the checkbox is modified by a method referred to as checkbox.setAttributeNS( );.

If this tree operation instruction sequence in an application program is generalized, it is expressed by the following expression.

$V$=doc.getElementByTagName("foo");

v.setAttribute . . .

Here, doc is an object for storing an original HTML document, and foo is a name of an arbitrary tag. The getElementByTagName is a function for fetching a document between a beginning tag and an ending tag of a designated name from doc. The fetched document is assigned to a variable v. If the next operation is performed on the variable v, the original HTML document stored on doc is also modified. That is to say, the tree operation instruction sequence includes an instruction for extracting a document object from an HTML document and an instruction for modifying the extracted document object.

In case that the extracting component 310 includes the tree operation instruction sequence included in the partial program 50, the generating component 320 transforms this tree operation instruction sequence as described below.

$doc1$=getElementByTagName_r($doc0$, $vN$, "foo");
$v0$=getElementByTagName($doc0$, "foo");
$v1$=setAttribute( . . . , $v0$, . . . );
$vN$= . . . ;

Here, a variable $doc0 shows a screen configuration before an operation by a tree operation instruction sequence. On the other hand, a variable $doc1 shows a screen configuration after an operation by a tree operation instruction sequence. Moreover, a variable $v0 stores copy data that are a document object copied from an original document by the getElementByTagName function (the second line). Moreover, a variable $vN stores a document generated by performing various types of operations, for example, the modification of attribute on the copy data stored on the variable $v0 (the third and fourth lines). Moreover, getElementByTagName_r is a function for replacing a document between a beginning tag and an ending tag of the tag foo in the screen by the contents of the variable $vN. The copy data on which various types of operations are performed are replaced by a part of the original document $doc0 (the first line).

That is to say, the generating component 320 transforms a tree operation instruction sequence to an instruction sequence for generating copy data obtained by copying data between a beginning tag and an ending tag from an initial screen, modifying the copy data, and replacing the original data in the initial screen by the transformed copy data.

Specifically, in an example of FIG. 8, the generating component 320 modifies the variable checkbox to two intermediate variables $checkbox1 and $checkbox2. The variable $checkbox1 is equivalent to the variable $v0 in a general example, the variable $checkbox2 is equivalent to the variable $vN in a general example, and the variable $unchecked is equivalent to $doc1 in a general example. Then, the generating component 320 generates an instruction for assigning an object event.target to the variable $checkbox1. The contents of the object event.target are specifically determined by the definition of the first schema information and the event. Therefore, the generating component 320 may generate an instruction for assigning concrete contents of the event.target to the variable $checkbox1.

Next, the generating component 320 generates an instruction for assigning a processing result for the tree operation instruction sequence to the variable $checkbox2. That is to say, a screen of which the attribute value of the checked attribute is modified to true among the screens stored on the variable $checkbox1 is assigned to the variable $checkbox2. Then, the generating component 320 generates an instruction for assigning a screen obtained by replacing the original screen according to the contents of the variable $checkbox2 to the variable $unchecked. As a result, a screen of which the attribute value of the checked attribute is modified to true is assigned to the variable $unchecked for storing a post operational screen.

According to the above transform, the partial program 50 is transformed to an SSA form in which an assignment is performed on each variable one by one. However, since the function setAttributeNS is a function for operating a single screen, it is not possible to calculate a set of screens satisfying the second schema information from a set of screens satisfying the first schema information according to such a method. For this reason, the generating component 320 further performs the next transform on the function setAttributeNS.

Assuming that contents capable of being obtained by the tree operation instruction sequence is T', an abstract content transform function is defined as a function Tr satisfying at least T'∈Tr (G) When a tree transform function takes a plurality of arguments, assuming that T is a set of contents and G is a set of schemas, the abstract content transform function is Tr such that F(T)∈Tr(G) is satisfied. A tree transducer such as a top-down tree transducer and a theoretical frame of an XML transform language and a query language can be utilized as a definition of such abstract content transform function. Hereinafter, it will be illustrated about a tree transducer.

FIG. 9 is a view exemplary showing a tree transducer used for a process for transforming the partial program 50 to the intermediate program 60. In the tree transducer, two states of a state q1 and a state q2 are defined. An operation by the function setAttributeNS is expressed as a transition from the state q1 to the state q2. In this tree transducer, each tag in the state q1 is maintained in the state q2 as it is, and only the attribute value of the checked attribute is modified to true.

The intermediate program 60 illustrated in FIG. 8 is generated by the above processes by the generating component 320.

Returning to FIG. 3, the determining component 330 subsequently determines whether each screen satisfies a specification on the basis of the intermediate program 60. Specifically, the determining component 330 first determines whether the first screen that is an initial screen satisfies the first schema information. Then, the determining component 330 determines whether a set of screens obtained by applying the intermediate program 60 to the first schema information satisfies the second schema information. Then, the determining component 330 determines that each screen satisfies the specification, on condition that the first screen satisfies the first schema information and the set of screens obtained by applying the intermediate program 60 to the first schema information satisfies the second schema information. When it is determined that the specification is satisfied, the determining component informs the extracting component 310 whether the third screen displayed next to the second screen satisfies the third schema information to make the extracting component determine whether the third screen satisfies the third schema information.

Figure 4:
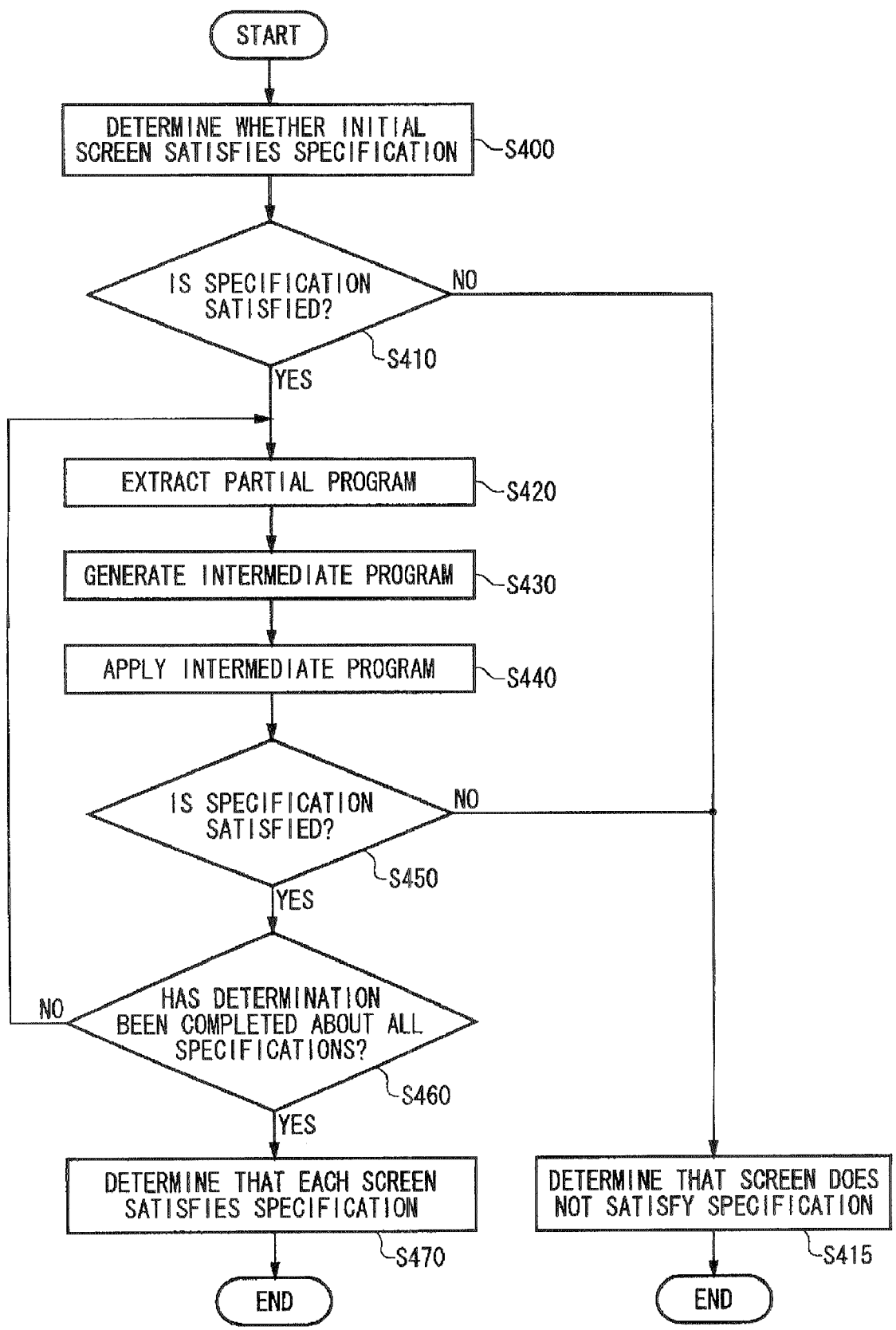
FIG. 4 is a view exemplary showing a process for determining whether each screen satisfies a specification.

FIG. 4 is a view exemplary showing a process for determining whether each screen satisfies a specification. First, the determining component 330 determines whether the first screen satisfies the first schema information (S400). If the first screen does not satisfy the first schema information (S400: NO), the determining component 330 determines that the specification is not satisfied (S415), and outputs the determined result to terminate the process. On the other hand, if the first screen satisfies the first schema information (S400: YES), the extracting component 310 extracts the partial program 50 executed in response to the occurrence of event during displaying any screen satisfying the first schema information, from the application program (S420).

Next, the generating component 320 generates the intermediate program 60 on the basis of the partial program 50 (S430). Next, the determining component 330 calculates a set of screens capable of being displayed next to the first screen by means of applying the intermediate program 60 to the first schema information (S440). Then, the determining component 330 determines whether the calculated set of screens satisfies the second schema information (S450). If the set does not satisfy the information (S450: NO), the determining component 330 determines that the screens capable of being displayed by the application program do not satisfy the specification (S415), and terminates the process shown in the present drawing. In this case, the determining component 330 may generate and output information showing how the first screen or the second screen is different from schema information.

On the other hand, if the set satisfies the information (S450: YES), the determining component 330 determines whether all schema information stored on the specification storing component 300 have been determined (S460). For example, in case that the third schema information prescribing the specification to be satisfied by the third screen displayed next to the second screen is stored on the specification storing component 300, the determinations for all schema information have not been still completed. For this reason, the satisfaction determining system 30 returns the process to S420. That is to say, the extracting component 310 extracts a partial program on the basis of the second schema information and an event for switching the display from the second screen to the third screen, and performs the next processes.

In response to the fact that the determinations for all schema information have been completed (S460: YES), the determining component 330 determines that each screen displayed by the application program satisfies the specification (S470), and outputs the determined result to terminate the process.

As above, according to the process described with reference to FIG. 4, the extracting component 310 can extract, for each of the plurality of screens capable of being displayed, a partial program executed in response to the occurrence of event during displaying this screen, on the basis of schema information corresponding to this screen and the event capable of being generated during displaying this screen. Then, the generating component 320 can generate, for each of the plurality of schema information, an intermediate program for calculating a set of screens displayed by the occurrence of event during displaying screens in this set from a set of screens satisfying this schema information, on the basis of the partial program executed during displaying the screen. Then, the determining component 330 can determine that each screen satisfies the specification, on condition that the initial screen satisfies the first schema information and the set of screens obtained by applying the intermediate program to each schema information satisfies schema information prescribing a specification of a screen displayed next to a screen satisfying this schema information.

Figure 5:
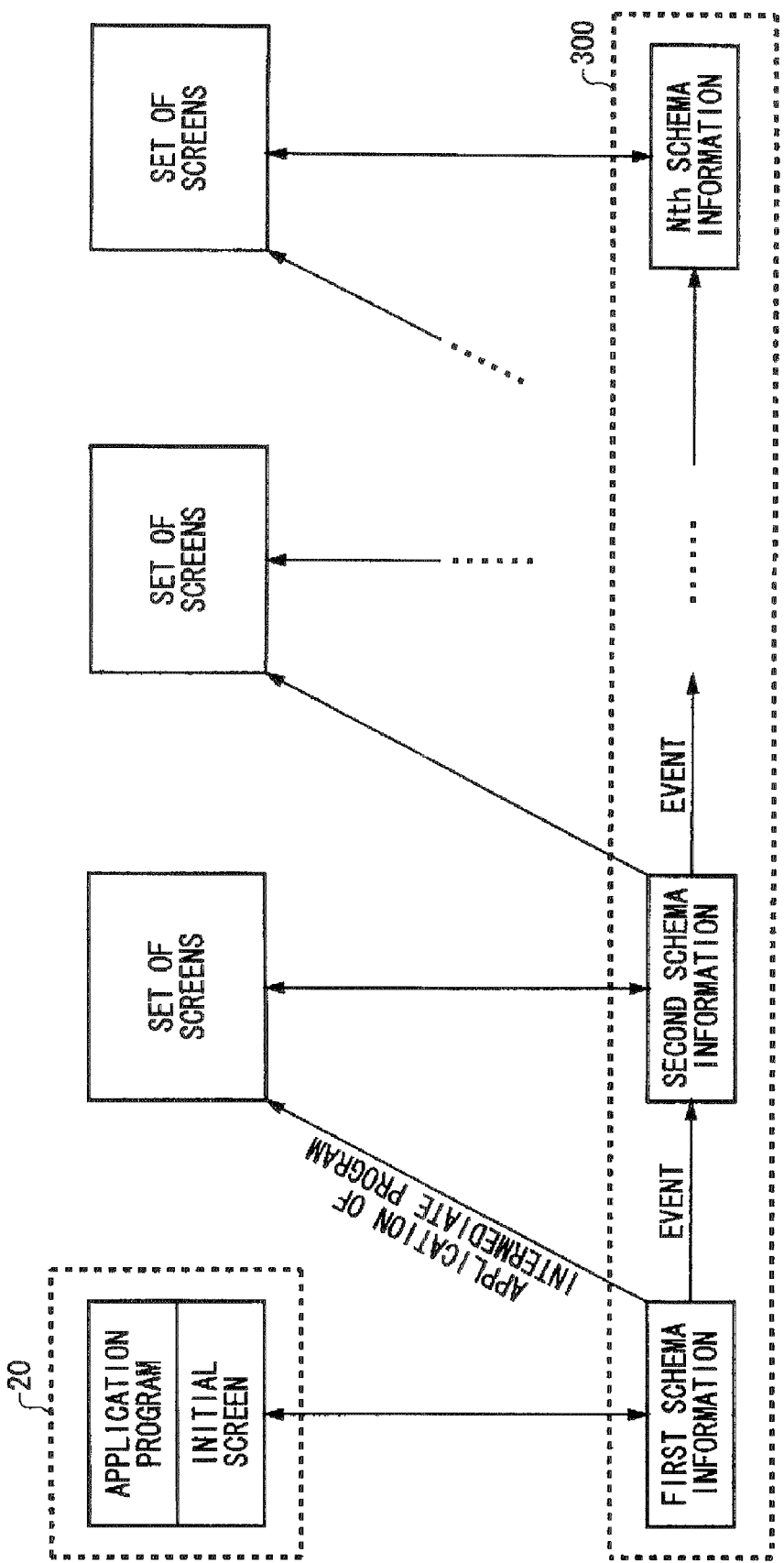
FIG. 5 is a conceptual diagram showing a determination by a satisfaction determining system.

FIG. 5 is a conceptual diagram showing the determination by the satisfaction determining system 30. The document database 20 stores an HTML document in which the initial screen of the plurality of screens is described and an application program for displaying the plurality of screens by means of sequentially changing the HTML document. That is to say, each of the plurality of screens is also a Web page described in HTML. Moreover, the application program may be a program that is embedded in the Web page and is described in JavaScript or the like.

The specification storing component 300 stores a plurality of schema information prescribing specifications to be satisfied by each of the plurality of screens. Moreover, the specification storing component 300 stores an event by which the display is changed from each screen into each of the other screens. The determining component 330 first determines whether the initial screen satisfies the first schema information. Next, the determining component 330 calculates a set of screens capable of being displayed according to the occurrence of event during displaying the screen satisfying the first schema information, by means of the intermediate program 60 generated on the basis of the first schema information. The determining component 330 determines whether this set of screens satisfies the second schema information. Similarly, the determining component 330 calculates a set of screens capable of being displayed according to the occurrence of event during displaying the screen satisfying the second schema information, by means of the intermediate program generated on the basis of the second schema information. Moreover, the determining component 330 determines whether this set of screens satisfies the third schema information. According to such a process, the screen does not satisfy any schema information, or the above process is repeated until the determinations for all schema information are completed.

As above, according to the satisfaction determining system 30 of the present embodiment, it is possible to determine whether each of screens being sequentially displayed by an application program satisfies a specification without executing the application program. In the case of this determination, a partial program including a tree operation instruction sequence is transformed to an intermediate program. Therefore, it is possible to perform a process on not a single screen but a set of screens satisfying a predetermined condition because the partial program is transformed to the intermediate program. As a result, although the program is not really executed, it is possible to effectively determine that a set of screens capable of being displayed according to the execution of program satisfies a specification.

Referring to FIGS. 10 to 14, it will be described about the case when an application program displays an entry field next to a check box.

Figure 10:
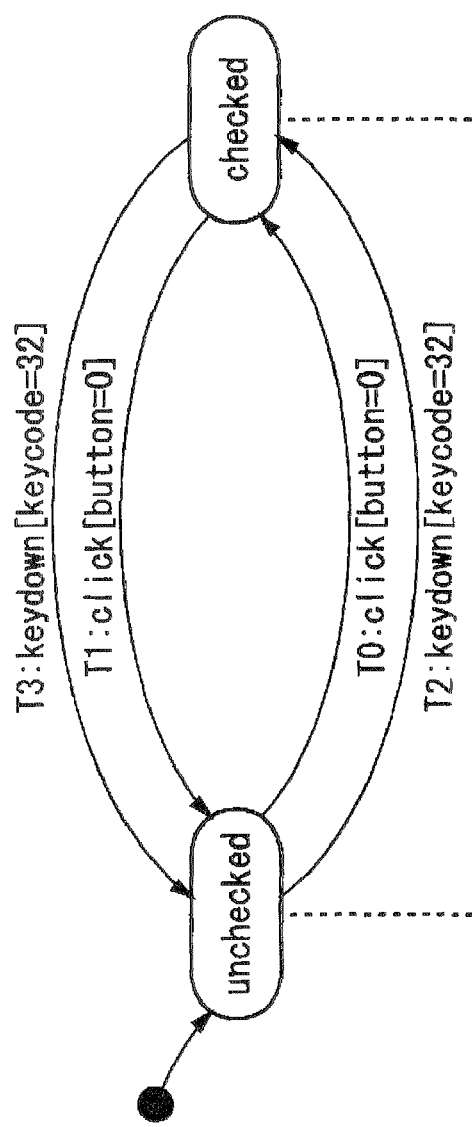
FIG. 10 is a view showing the second example of a specification stored on a specification storing component.

FIG. 10 is a view showing the second example of a specification stored on the specification storing component 300. The first schema information prescribing a specification of the first screen on which a check box is not checked is shown in the lower-left side on the present drawing. Moreover, the second schema information prescribing a specification of the second screen on which the check box is checked is shown in the lower-right side on the present drawing. An event by which the display is switched from the first screen to the second screen is a left-click (T0) of the mouse or a push-down (T2) of the space key. An event by which the display is switched from the second screen to the first screen is a left-click (T1) of the mouse or a push-down (T3) of the space key.

Since the first schema information shown in FIG. 10 is equal to the first schema information described with reference to FIG. 6, its description is omitted. The second schema information includes a non-terminal symbol G9 in a span tag in a body tag in addition to the first schema information. The G9 includes an input tag. That is to say, the second schema information prescribes that the second screen should include the input tag.

FIG. 11 is a view showing the second example of the partial program 50. For purposes of illustration, the function checkBoxEvent is extracted from the application programs stored on the document database 20, and is shown in the upper part on the present drawing. The extracting component 310 determines which branch destination is executed for each conditional branch instruction included in the application program, on the basis of these state and event prescribed in the first schema information. As shown in FIG. 10, an event by which the display is switched from the first screen to the second screen is a left-click of the mouse or a push-down of the space key. For this reason, a condition for a conditional branch instruction on the third and fourth lines is satisfied. That is to say, the extracting component 310 determines that an instruction sequence from the fifth line to the 16th line is executed.

Moreover, the first schema information includes a checked attribute of which an attribute value is false. For this reason, a condition for a conditional branch instruction on the seventh line is not satisfied. That is to say, the extracting component 310 determines that an else paragraph beginning with the eleventh line is executed. The extracting component 310 generates the partial program 50 by means of continuously ranking an instruction sequence at the branch destination determined that is executed in this way. As a result, the partial program 50 includes an instruction modifying the attribute value of the checked attribute to true and an instruction generating the input tag.

FIG. 12 is a view showing the second example of the intermediate program 60. For purposes of illustration, the partial program 50 is shown in the upper portion on the present drawing. The generating component 320 first performs SSA (Static Single Assignment) transform on the partial program 50 in order to uniquely prescribe a definition of each variable in the program and generate a plurality of instructions of which execution results are equal to those of the partial program 50. The generated instruction sequence is shown in the middle portion on the present drawing. The partial program 50 according to the present example includes an instruction for fetching a portion, on which an event occurs, from an initial screen, an instruction for modifying an attribute value, and an instruction for adding a tag as a tree operation instruction sequence. Therefore, three-times assignments are performed on the variable checkbox.

For this reason, the generating component 320 modifies the variable checkbox to three intermediate variables $checkbox1, $checkbox2, and $checkbox3. The variable $checkbox1 is equivalent to a variable $v0 in a general example, the variable $checkbox2 is equivalent to a variable $v1 in a general example, the variable $checkbox3 is equivalent to a variable $vN in a general example, and the variable $unchecked is equivalent to a $doc1 in a general example. Then, the generating component 320 generates an instruction for assigning an object event.target to the variable $checkbox1. Next, the generating component 320 generates an instruction for assigning the first processing result for the tree operation instruction sequence to the variable $checkbox2. That is to say, a screen of which the attribute value of the checked attribute is modified to true in a screen stored in the variable $checkbox1 is assigned to the variable $checkbox2. Next, the generating component 320 generates an instruction for assigning the second processing result for the tree operation instruction sequence to the variable $checkbox3. That is to say, a screen to which the tag input is added in a screen stored in the variable $checkbox2 is assigned to the variable $checkbox3. Then, the generating component 320 generates an instruction for assigning a screen obtained by replacing an original screen by means of the contents of the variable $checkbox3 to the variable $unchecked. As a result, the screen of which the attribute value of the checked attribute is modified to true and to which the tag input is added is assigned to the variable $unchecked for storing a postoperational screen.

According to the above transform, the partial program 50 is transformed to an SSA form in which an assignment is performed on each variable one by one. However, since a function setAttributeNS, a function append child, and a function removeChild are functions operating on a single screen, in such a state, a set of screens satisfying the second schema information cannot be calculated from a set of screens satisfying the first schema information. For this reason, the generating component 320 performs transform using a tree transducer on each of the function setAttributeNS, the function append child, and the function removeChild. Since the transform of the function setAttributeNS is equal to that of FIG. 9, its description is omitted. The transform of the function applendChild is shown in FIG. 13 and the transform of the function removeChild is shown in FIG. 14.

Figure 13:
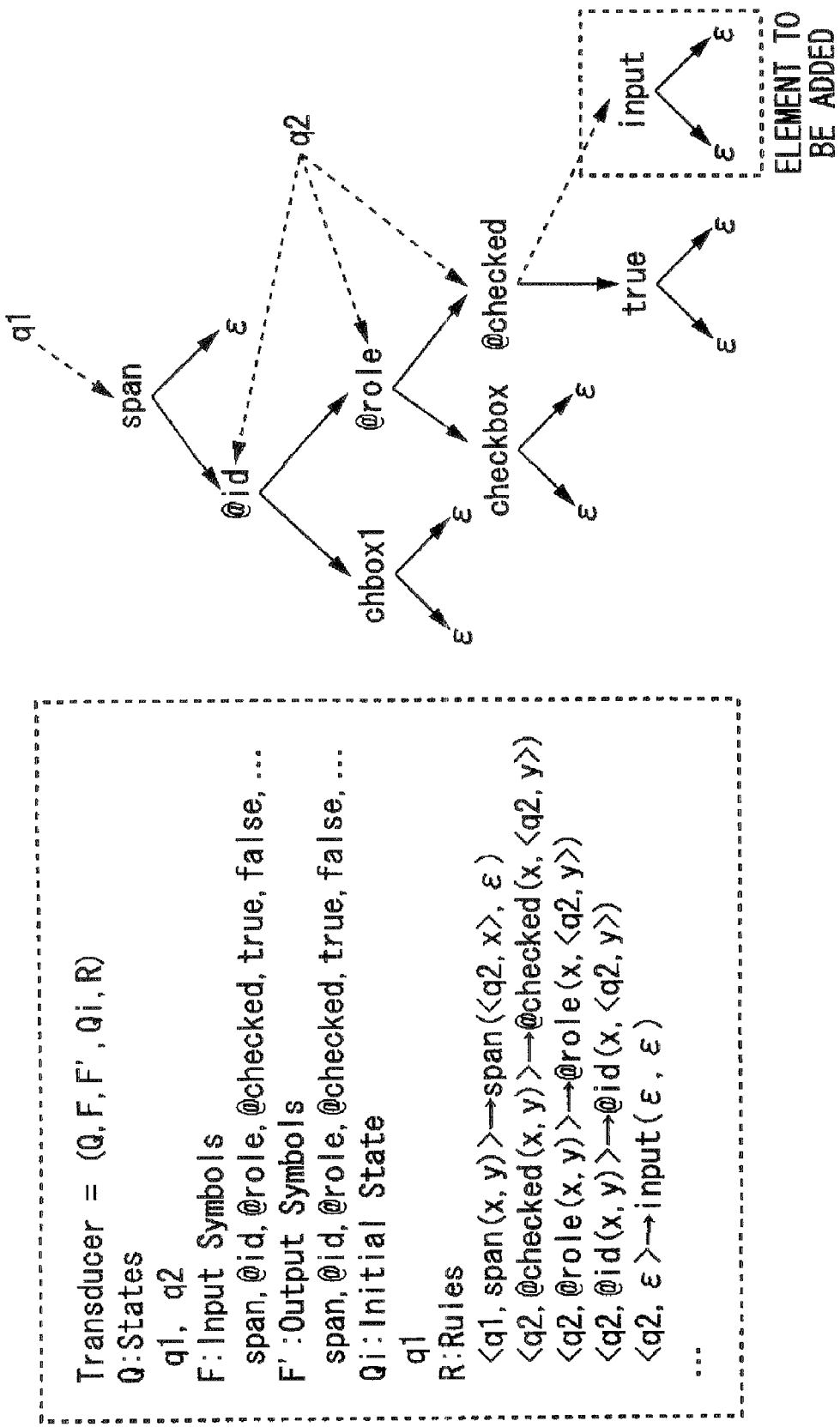
FIG. 13 is a view exemplary showing a tree transducer used for a process for transforming a partial program to an intermediate program.

FIG. 13 is a view exemplary showing a tree transducer used for a process for transforming the partial program 50 to the intermediate program 60. In the tree transducer, two states of a state q1 and a state q2 are defined. An operation by the function appendChild is expressed as a transition from the state q1 to the state q2. In this tree transducer, each tag in the state q1 is maintained in the state q2 as it is, and only the tag input is added. However, since the variable $checkbox1 is not handled by the tree transducer as it is, the generating component 320 encodes this into a binary tree. Since the detailed description has been conventionally known in Non-Patent Document (7), its description is omitted.

Figure 14:
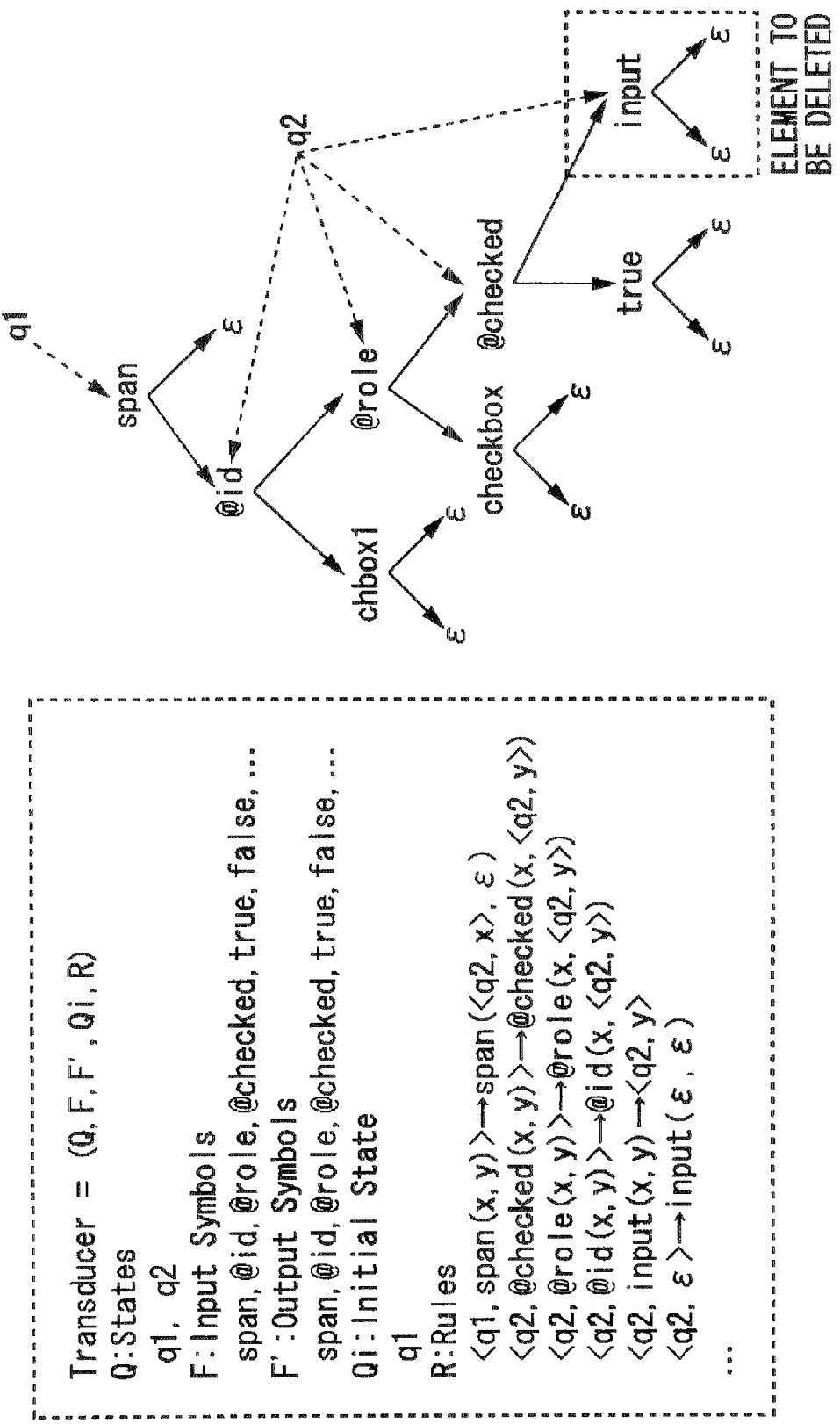
FIG. 14 is a view exemplary showing a tree transducer used for a process for transforming a partial program to an intermediate program.

FIG. 14 is a view exemplary showing a tree transducer used for a process for transforming the partial program 50 to the intermediate program 60. In the tree transducer, two states of a state q1 and a state q2 are defined. An operation by the function removeChild is expressed as a transition from the state q1 to the state q2. In this tree transducer, each tag in the state q1 is maintained in the state q2 as it is, and only the tag input is deleted. In addition, the tree transducer shown in FIG. 14 premises that only one tag with a name referred to as input exists on a HTML document. When a plurality of tags with a name referred to as input is included in the HTML document, it is necessary to attach an identifiable number to each tag or to change each tag into names different from one another in order to identify each tag.

As described above with reference to FIGS. 10 to 14, according to the satisfaction determining system 30, it is possible to effectively determine, for an application program for making a screen display an entry field next to a check box when the check box has been checked, whether each screen being displayed by this program satisfies a specification.

Figure 15:
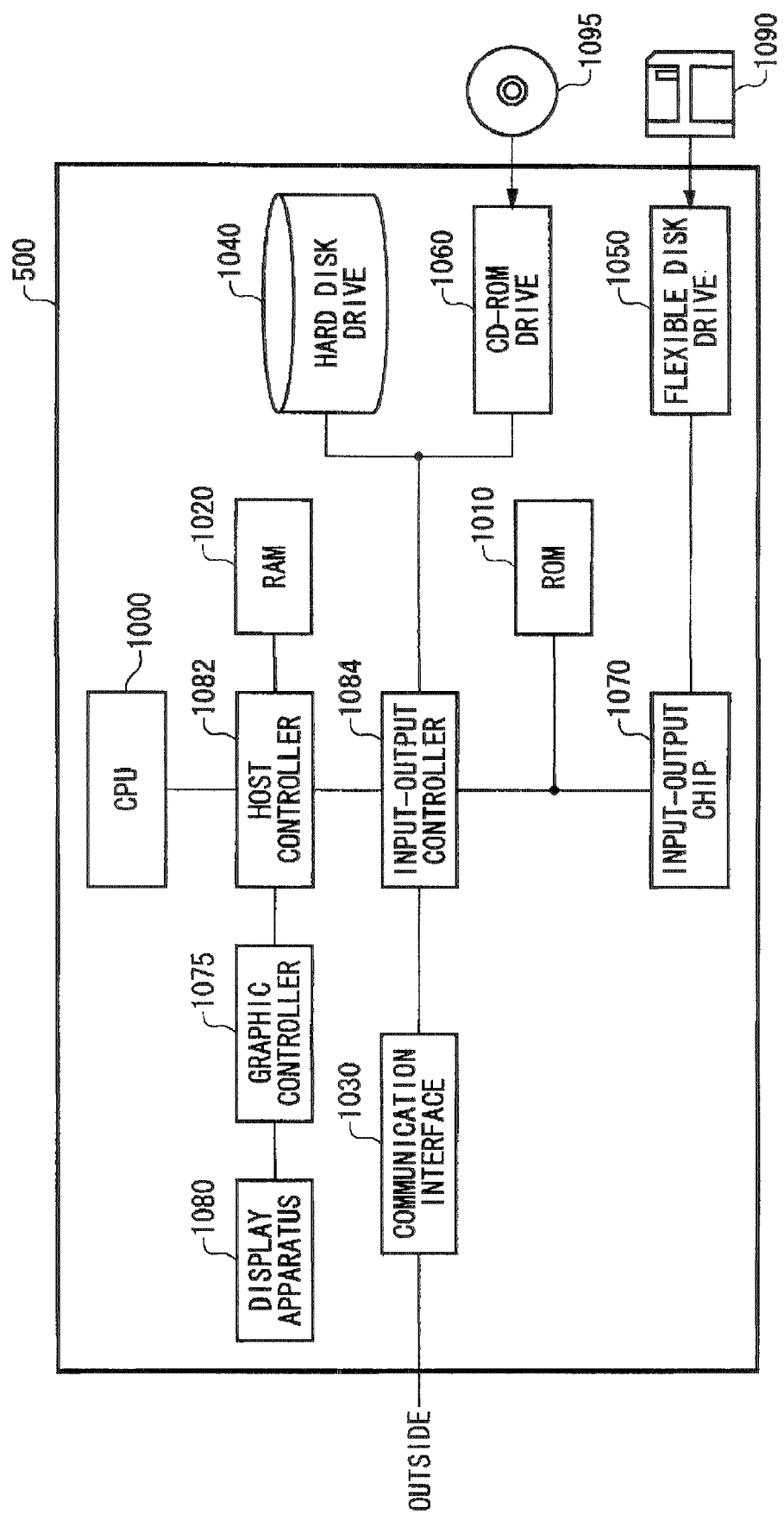
FIG. 15 is a view exemplary showing a hardware configuration of an information-processing apparatus functioning as a satisfaction determining system.

FIG. 15 is a view exemplary showing a hardware configuration of an information-processing apparatus 500 functioning as the satisfaction determining system 30. The information-processing apparatus 500 includes a CPU peripheral component having a CPU 1000, a RAM 1020, and a graphic controller 1075 that are connected to one another by a host controller 1082, an input-output component having a communication interface 1030, a hard disk drive 1040, and a CD-ROM drive 1060 that are connected to the host controller 1082 by an input-output controller 1084, and a legacy input-output component having a ROM 1010, a flexible disk drive 1050, and an input-output chip 1070 that are connected to the input-output controller 1084.

The host controller 1082 connects the RAM 1020 to the CPU 1000 and the graphic controller 1075 for accessing the RAM 1020 at high transfer rate. The CPU 1000 operates based on a program stored on the ROM 1010 and the RAM 1020 to control each component. The graphic controller 1075 acquires image data generated by the CPU 1000 on a frame buffer provided in the RAM 1020, and displays the data on the display apparatus 1080. Alternatively, the graphic controller 1075 may include therein the frame buffer storing the image data generated from the CPU 1000.

The input-output controller 1084 connects the host controller 1082 to the communication interface 1030, the hard disk drive 1040, and the CD-ROM drive 1060 that are comparatively fast input-output apparatus. The communication interface 1030 communicates with outside apparatuses via a network. The hard disk drive 1040 stores a program and data to be used by the information-processing apparatus 500. The CD-ROM drive 1060 reads a program or data from a CD-ROM 1095, and provides the program or data to the RAM 1020 or the hard disk drive 1040.

Moreover, the ROM 1010, the flexible disk drive 1050, and the input-output chip 1070 that are a comparatively low-speed input-output apparatus are connected to the input-output controller 1084. The ROM 1010 stores a boot program to be executed by the CPU 1000 during starting the information-processing apparatus 500, a program dependent on hardware of the information-processing apparatus 500, or the like. The flexible disk drive 1050 reads a program or data from a flexible disk 1090, and provides the program or data to the RAM 1020 or the hard disk drive 1040 via the input-output chip 1070. The input-output chip 1070 connects various kinds of input-output apparatuses via the flexible disk 1090, a parallel port, a serial port, a keyboard port, a mouse port, or the like.

A program provided to the information-processing apparatus 500 is stored on a recording medium such as the flexible disk 1090, the CD-ROM 1095, or an IC card in order to be provided by a user. The program is read from the recording medium via the input-output chip 1070 and the input-output controller 1084 to be installed and executed in the information-processing apparatus 500. Since operations performed by working on the information-processing apparatus 500 or the like by the program are the same as those by the satisfaction determining system 30 described in FIGS. 1 to 14, their descriptions will be omitted.

A program described above maybe stored on an outside storage medium. A storage medium can include an optical recording medium such as a DVD and a PD, a magneto-optical recording medium such as an MD, a tape medium, a semiconductor memory such as an IC card in addition to the flexible disk 1090 and the CD-ROM 1095. Moreover, a storage device such as a hard disk or RAM provided in a server system connected to a private communication network and Internet maybe used as a recording medium to provide a program to the information-processing apparatus 500 via a network.

Although the present invention has been described by way of exemplary embodiments, it should be understood that those skilled in the art might make many changes and substitutions without departing from the spirit and the scope of the present invention which is defined only by the appended claims.

The invention claimed is:

1. A computer-implemented method for determining whether a plurality of screens to be sequentially displayed by an application program satisfies a prepared specification by means of an information-processing apparatus, the information-processing apparatus comprising a specification storing component that stores first schema information prescribing a specification to be satisfied by a first screen, second schema information prescribing a specification to be satisfied by a second screen, and an event making the display by the application program be changed from the first screen into the second screen, said method comprising:

extracting, by a computing device, a partial program from the application program, which is executed in response to the occurrence of event during displaying any screen satisfying the first schema information, on the basis of the first schema information and the event;

generating, by said computing device, from a first set of screens satisfying the first schema information, an intermediate program for calculating a second set of screens to be displayed on condition that the event occurs during displaying screens in said first set of screens on the basis of the partial program; and determining, by said computing device, that the plurality of screens satisfies the prepared specification on condition that the first set of screens satisfies the first schema information and said second set of screens obtained by applying the intermediate program to the first schema information satisfies the second schema information, the extracting determines a branch destination to be executed and extracts a sequence of instructions on the branch destination to be executed according to the determination along with the partial program, on the basis of a state of the screen prescribed in the first schema information and the event, for each conditional branch instruction included in the application program, the generating performs SSA (Static Single Assignment) transformation on the partial program to uniquely prescribe the assignment to each variable in the partial program and generates a plurality of instructions having the same result as a result obtained by executing the partial program as the intermediate program, each of the plurality of screens comprises data with a tree structure including intermediate beginning and ending tags between a beginning tag and an ending tag, the extracting selects data between first beginning and ending tags from the first screen and extracts a tree operation instruction sequence for modifying the selected data along with the partial program, the generating transforms the tree operation instruction sequence to an instruction sequence for generating copy data obtained by copying data between the first beginning and ending tags from the first screen, modifying the copy data, and replacing data to be copied in the first screen by modified copy data, each of the plurality of screens comprises a Web page described in HTML (Hyper Text Markup Language), the application program is a modifying program that is described in JavaScript and modifies the display on this Web page, the extracting extracts an instruction for extracting a document object from a HTML document and an instruction for modifying the document object from the modifying program as the tree operation instruction sequence, the generating transforms the tree operation instruction sequence to an instruction sequence for generating the copy data by copying the document object extracted from the HTML document, modifying the copy data, and replacing the document object extracted from the HTML document by the modified copy data, the specification storing component stores a plurality of schema information prescribing specifications to be satisfied by the plurality of screens and events making the display be changed from each of the plurality of screens into each of the other screens, the extracting extracts, for each of the plurality of screens, a partial program to be executed in response to the occurrence of event during displaying a specific screen on the basis of specific schema information corresponding to said specific screen and an event capable of being generated during displaying said specific screen, the generating generates, for each of the plurality of schema information and from a third set of screens satisfying said specific schema information, an intermediate program for calculating a set of screens to be displayed on condition that the event occurs during displaying screens in this said third set on the basis of the partial program to be executed during displaying said specific screen, and the determining determines that the plurality of screens satisfies the prepared specification on condition that an initial screen satisfies the first schema information and a subsequent set of screens obtained by applying the intermediate program to each of the schema information satisfies schema information prescribing a specification of a screen to be displayed following the initial screen satisfying this schema information.

* * * * *